United States Patent
Achhra et al.

(10) Patent No.: US 10,664,838 B2
(45) Date of Patent: May 26, 2020

(54) SYSTEMS AND METHODS TO AUTHORIZE TRANSACTIONS BASED ON SECURELY ACCESSING DATA TRACKED VIA MOBILE DEVICES

(71) Applicant: Visa International Service Association, San Francisco, CA (US)

(72) Inventors: Santosh Lachhman Achhra, Singapore (SG); Sonny Swords, Foster City, CA (US); Sergey Alex Paykis, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 1086 days.

(21) Appl. No.: 15/092,297

(22) Filed: Apr. 6, 2016

(65) Prior Publication Data

US 2016/0307196 A1 Oct. 20, 2016

Related U.S. Application Data

(60) Provisional application No. 62/147,839, filed on Apr. 15, 2015.

(51) Int. Cl.
*G06Q 20/40* (2012.01)
*G06F 21/62* (2013.01)
(Continued)

(52) U.S. Cl.
CPC ......... *G06Q 20/401* (2013.01); *G06F 21/335* (2013.01); *G06F 21/35* (2013.01);
(Continued)

(58) Field of Classification Search
CPC .... G06Q 20/401; G06Q 20/322; G06Q 20/40; G06F 21/335; G06F 21/35; G06F 21/6245
See application file for complete search history.

(56) References Cited

U.S. PATENT DOCUMENTS 8,458,487 B1 * 6/2013 Palgon .................... G06F 21/00
380/277
9,191,375 B2 * 11/2015 Kaler .................. H04L 63/0435
(Continued)

*Primary Examiner* — Thien M Le
*Assistant Examiner* — Asifa Habib
(74) *Attorney, Agent, or Firm* — The Webb Law Firm

(57) ABSTRACT

Systems and methods to process an authorization request related to mobile data stored by a mobile application in an account hosted on a server and accessed via an access token obtained via the mobile device during a registration session with a portal of an authorization processing system that stores an item associating with an account identifier. The access token is stored in a data warehouse in association with an account identifier registered during the registration session. In response to an authorization request containing the account identifier is determined by the authorization processing system to have satisfied a first set of conditions specified in the item associated with the account identifier, the portal is instructed to use the access token to communicate with the server to determine whether a second set of conditions identified by the item are met by the mobile data stored in the account hosted on the server that is separately operated from the authorization processing system.

20 Claims, 7 Drawing Sheets

(51) Int. Cl.
  *G06Q 20/32*   (2012.01)
  *G06F 21/35*   (2013.01)
  *G06Q 20/38*   (2012.01)
  *G06F 21/33*   (2013.01)
  *H04L 29/06*   (2006.01)
  *H04M 1/725*   (2006.01)

(52) U.S. Cl.
  CPC ....... *G06F 21/6245* (2013.01); *G06Q 20/322* (2013.01); *G06Q 20/3821* (2013.01); *G06Q 20/40* (2013.01); *H04L 63/0807* (2013.01); *H04L 63/0815* (2013.01); *H04L 63/102* (2013.01); *H04M 1/72522* (2013.01)

(56) References Cited

U.S. PATENT DOCUMENTS

| | | | | |
|---|---|---|---|---|
| 2001/0049707 | A1* | 12/2001 | Tran | G06Q 10/10 715/256 |
| 2009/0319296 | A1* | 12/2009 | Schoenberg | G06Q 10/10 705/2 |
| 2012/0029990 | A1* | 2/2012 | Fisher | G06Q 20/105 705/14.19 |
| 2014/0351033 | A1* | 11/2014 | Azevedo | G06Q 30/0222 705/14.19 |
| 2015/0112870 | A1* | 4/2015 | Nagasundaram | G06Q 20/3821 705/67 |
| 2015/0331997 | A1* | 11/2015 | Joao | G06F 19/322 705/3 |
| 2016/0092872 | A1* | 3/2016 | Prakash | G06Q 20/3829 705/65 |
| 2017/0039599 | A1* | 2/2017 | Tunnell | G06Q 30/0255 |
| 2017/0286768 | A1* | 10/2017 | Livesay | H04L 63/08 |
| 2018/0053200 | A1* | 2/2018 | Cronin | G06Q 30/0208 |

\* cited by examiner

SYSTEMS AND METHODS TO AUTHORIZE TRANSACTIONS BASED ON SECURELY ACCESSING DATA TRACKED VIA MOBILE DEVICES

RELATED APPLICATIONS

The present application claims the benefit of the filing date of Prov. U.S. Pat. App. Ser. No. 62/147,839, filed Apr. 15, 2015 and entitled "Systems and Methods using Mobile Devices to Track Information Related to Authorization", the entire disclosure of which application is hereby incorporated herein by reference.

The present application relates to: U.S. Pat. App. Pub. No. 2009/0112766, and entitled "Device Including Multiple Payment Applications"; U.S. Pat. App. Pub. No. 2013/0024371, and entitled "Electronic Offer Optimization and Redemption Apparatuses, Methods and Systems"; U.S. Pat. App. Pub. No. 2010/0211445, and entitled "Incentives Associated with Linked Financial Accounts"; U.S. Pat. App. Pub. No. 2005/0071227, and entitled "Method and System for Managing Concurrent SKU-based Rewards Program"; and U.S. Pat. App. Pub. No. 2005/0071225, now U.S. Pat. No. 8,260,661 and entitled "System and Apparatus for Linking Multiple Rewards Programs to Promote the Purchase of Specific Product Mixes", the entire disclosures of which applications are hereby incorporated herein by reference.

FIELD OF THE TECHNOLOGY

At least some embodiments disclosed herein relate to secure access of information for authorization.

BACKGROUND

Using communication technologies separate computers disposed at separate locations can be configured to work together to process certain tasks. For examples, mobile devices can be used to collect data at the locations of the users of the mobile devices; some servers can be used to store the data in a centralized location; and other servers may be used to process the data.

There are technologies for the authorization of a third party to access the account of a user on a server without exposing their password the third party. For example, OAuth is an open standard for an authorization process that allows a resource owner to authorize a third-party access to their resources stored on a server without sharing the credential of the resource owner with third-party.

U.S. Pat. App. Pub. No. 2005/0074126, entitled "Single Sign-on Over the Internet using Public-Key Cryptography", discloses an authentication server that allows a client to sign into a separate secure server using a ticket obtained from the authentication server.

U.S. Pat. App. Pub. No. 2014/0351033, entitled "Systems and Methods of Incentivizing Transactions", discloses an offer of a discount or other incentive contingent upon social media promotion requirements, such as a health update. The health update may be food data tracking food intake, fitness data (e.g., walking, running, biking, or swimming data) collected by a fitness device, and medical data tracking a medical condition, medical test results, or health data by devices such as a scale, a pedometer, a glucose meter, a body fat meter, a health tracking device, or a health organization server.

U.S. Pat. App. Pub. No. 2009/0112766, entitled "Device Including Multiple Payment Applications", discloses a method to automatically select one or more payment applications, such as credit cards, debit cards, to use in a transaction so that the selected payment applications give the consumer an optimized benefit or benefits. The method can be implemented in portable consumer devices, such as phones. For example, a portable consumer device stores payment applications corresponding to payment cards. After the portable consumer device receives transaction information about the items being purchased from a point-of-sale device, the portable consumer device determines which of the payment applications stored in it will give the consumer the optimal benefit. For example, after receiving the transaction information, the portable consumer device determines that the consumer is purchasing groceries and then determines the payment application that provides the optimum benefit for the consumer for the current transaction.

U.S. Pat. App. Pub. No. 2013/0024371, and entitled "Electronic Offer Optimization and Redemption Apparatuses, Methods and Systems", discloses an e-wallet account that can hold payment accounts, such as a credit card, a debit card, etc. After receiving a purchase order request via the consumer wallet device, the system determines an optimized payment card and offer selection based on the user payment card and offer selection preference data to execute a payment transaction using the optimized payment card and offer selection in response to the purchase order request.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
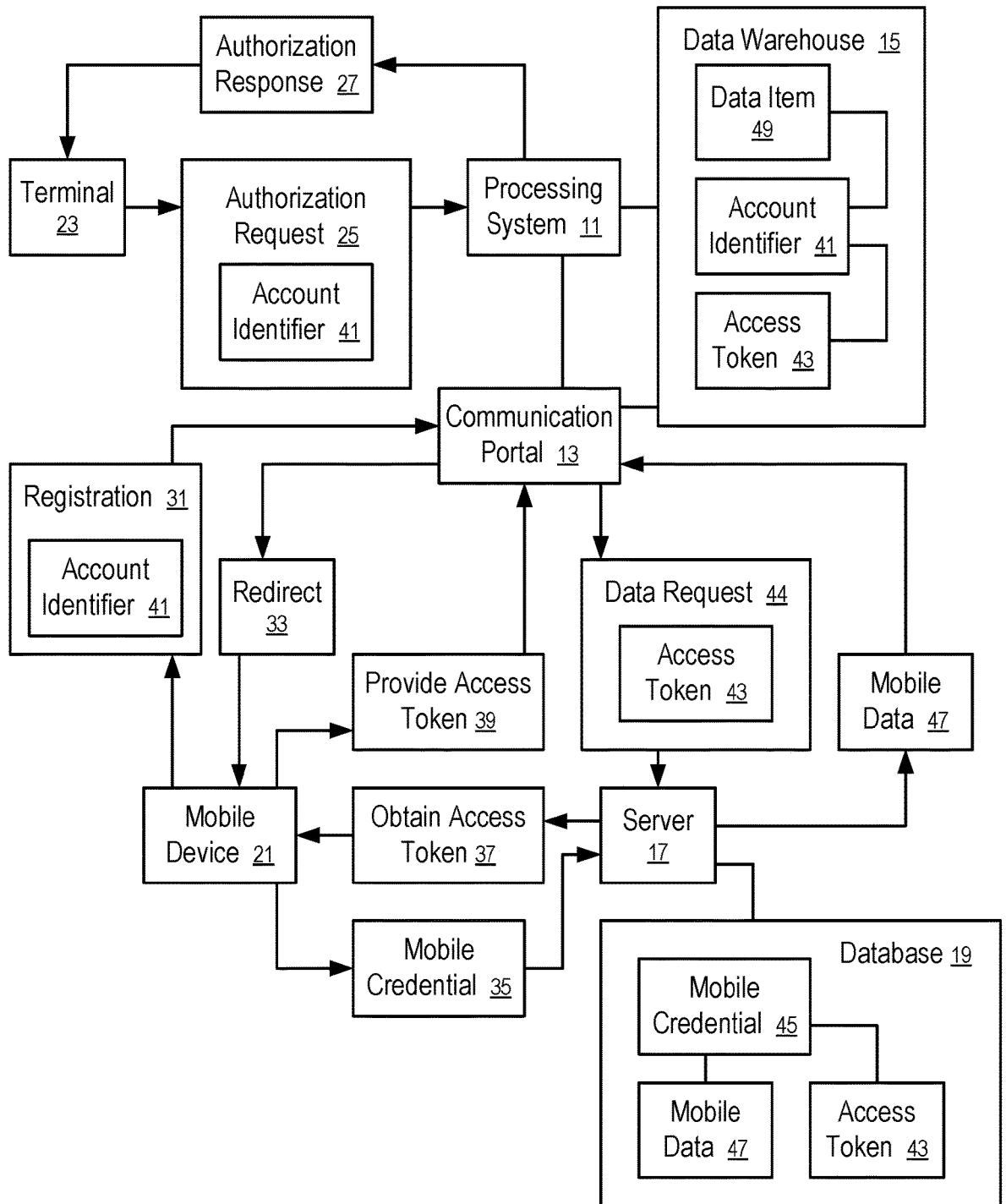
FIG. 1 shows a system to process authentication/authorization according to one embodiment.

FIG. 1 shows a system to process authentication/authorization according to one embodiment.

In FIG. 1, a processing system (11) is coupled with a communication portal (13) and a data warehouse (15) that is configured to store a data item (49) in association with an account identifier (41) and store an access token (43) in association with the account identifier (41).

In FIG. 1, a mobile device (21) is configured to run a mobile application that generates mobile data (47). When the mobile device (21) has a communication connection with the server (17) (e.g., via Internet), the mobile application communicates the mobile data (17) to the server (17), which stores the mobile data (17) in its database (19) in an account controlled by the mobile credential (45), such as a login name and password, user finger print data, user voice characteristic data, user facial characteristic data, etc.

The mobile credential (45) is configured to secure the access to the account in which the mobile data (17) is stored on the server (17). For example, if a user of the mobile device attempts to access the account, the server (17) is configured to challenge the user to present the correct mobile credential (45). If the user provides a credential that agrees with the mobile credential (45) of the account, the server (17) allows the user to access the account storing the mobile data (47); otherwise, the server (17) denies the user access to the account.

In FIG. 1, an access token (43) is configured to allow the communication portal (13) to access the mobile data (47) without the knowledge of the mobile credential, such that when the processing operation in the processing system (11) requires the mobile data (47), the communication portal (13) is configured to use the access token (43) to access the mobile data (47), even when the communication portal (13) cannot establish a communication connection with the mobile device (21) at a time of the processing operation.

Prior to the processing operations that require the mobile data (47), the mobile device (21) communicates with the communication portal (13) for a registration (41) of the account identifier (41). To register the account identifier (41) in the data warehouse (15) and authorize the communication portal (13) to access the mobile data (47) controlled under the mobile credential (45) in the server (17), the communication portal (13) temporarily redirect (33), during the registration session, the mobile device (21) to the server (17). After the user of the mobile device (21) provides the correct mobile credential (35) to the server (17) for authentication, the server (17) generates an access token (43), stores the access token (43) in its database (19) in association with the mobile credential (45), and provides the access token (37) to the mobile device (21). Thus, after obtaining (37) the access token (37), the mobile device (21) returns to the registration session with the communication portal (13) and provides (39) the access token (43) to the communication portal (13), which stores the access token (43) in association with the account identifier (41) that is being registered (31).

The access token (43) can be configured to provide limited access to the mobile data (47) without the mobile credential (45). For example, the access token (43) can be configured to expire within a predetermined period of time, and/or a predetermined number of uses. For example, the access token (43) can be configured to allow access to a predetermined subset of the mobile data (47). For example, the access token (43) can be configured to allow the server (17) to provide a response indicating whether or not a set of conditions are met by the mobile data (47) without providing the mobile data (47) itself. When the communication portal (13) provides the access token (43) in a data request (44) transmitted to the server (17), the server (17) identifies the mobile data (47) associated with the corresponding access token (43) and allows the communication portal (13) to access the mobile data (47) in a way consistent with the access privileges specified for the access token (43)

After the access token (43) is stored in the data warehouse (15), the processing system (11) can perform operations that require access to the mobile data (47).

For example, when a terminal (23) generates an authorization request (25) using the account identifier (41), the processing system (11) may use the data item (49) to determine whether an authorization response (27) requires the access to the mobile data (47); and if so, the communication portal (13) is instructed to use the access token (43) to access the mobile data (47) on the server (17).

At the time of the processing of the authorization request (25), the mobile device (21) may or may not have communication connections with the communication portal (13) and/or the server (17). Thus, even if the mobile device (21) is not accessible at the time, the communication portal (13) and/or the processing system (11) can use the mobile data (47) stored in the database (19) of the server (17) to process the authorization request (25). Alternatively or in combination, the communication portal (13) is configured to access the mobile data (47) directly from the mobile device (21) and if the mobile device (21) is not accessible, then access the mobile data (47) via the server (17).

With the access token (43) identifying the authorization for the communication portal (13) to access the mobile data (47), the server (17) and the communication portal (13) communicate with each other to provide access to the mobile data (47) for the processing of the authorization request (41) in accordance with the data item (49).

For example, the communication portal (13) may request the transmission of a subset of the mobile data (47), as authorized by the access token (43) from the database (19) of the server to the communication portal (13). The communication portal (13) then determines, based on the received subset of the mobile data (47) whether or not a set of conditions identified in the data item (49) are satisfied.

Alternatively, the communication portal (13) may submit a query to the server (17) identifying the set of conditions, and request the server (17) to determine whether nor not the set of conditions are satisfied by the mobile data (47) and provide the result in a reply to the query. The server (17) provides the request as authorized by the access token (43).

In one embodiment, the account identifier (41) identifies an account hosted on a computer connected in a network in communication with the processing system (11), where the computer is separate from the server (17); and the account hosted on the computer is separate from the account on the server (17) controlled by the mobile credential (45). The mobile device (21) is configured in one embodiment to present the account identifier (41) to the terminal (23) (e.g., via near field communications) to cause the terminal (23) to generate the authorization request (25) in order to use resources hosted in the account controlled by the computer.

Figure 2:
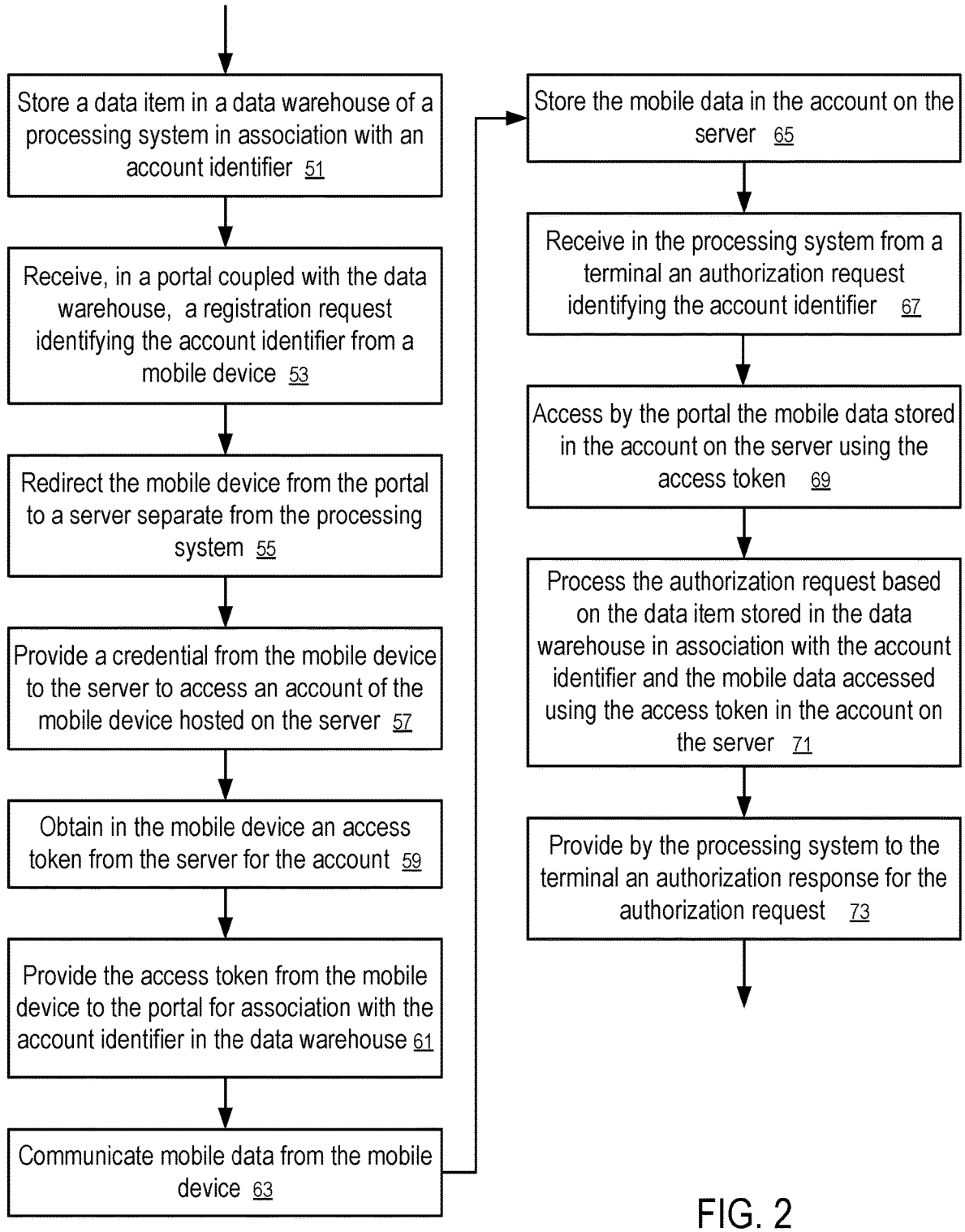
FIG. 2 shows a method to process authentication/authorization according to one embodiment.

FIG. 2 shows a method to process authentication/authorization according to one embodiment. For example, the method of FIG. 2 can be performed in the system of FIG. 1.

In FIG. 2, a computing apparatus is configured to: store (51) a data item (49) in a data warehouse (15) of a processing system (11) in association with an account identifier (41); receive (53), from a mobile device and in a portal (13) coupled with the data warehouse (15), a registration request (31) identifying the account identifier (41); redirect (55) the mobile device (21) from the portal (13) to a server (17) separate from the processing system (11); provide (57) a credential (34) from the mobile device (21) to the server (17) to access an account of the mobile device (21) hosted on the server (17); obtain (59) in the mobile device an access token (43) from the server (17) for the account; and provide (61) the access token (43) from the mobile device (21) to the portal (13) for association with the account identifier (41) in the data warehouse (15).

In FIG. 2, the mobile device communicates (63) mobile data (47) to the server (17), which stores (65), in the database (19), the mobile data (47) in the account controlled by the credential (45) on the server (17). In general, the mobile data (47) can be uploaded to the server (17) before, during and/or after the registration. For example, a first portion of the mobile data (47) can be uploaded to the server (17) before the registration session; a second portion of the mobile data (47) can be uploaded to the server (17) during the registration session; and a third portion of the mobile data (47) can be uploaded to the server (17) after the registration session.

In FIG. 2, the computing apparatus is further configured to: receive (67) in the processing system (11) from a terminal (23) an authorization request (25) identifying the account identifier (41); access (69) by the portal (13) the mobile data (47) stored in the account on the server (17) using the access token (43); process (71) the authorization request (25) based on the data item (49) stored in the data warehouse (15) in association with the account identifier (41) and the mobile data (47) accessed using the access token (43) in the account on the server (17); and provide (73) by the processing system (11) to the terminal (23) an authorization response (27) for the authorization request (25).

The system and method of FIGS. 1 and 2 can be used to implement the redemption of offer benefits that are dependent on the data tracked by an mobile application during the authorization process of a payment transaction in an electronic payment processing network.

For example, an offer to a user can be configured to provide a benefit (e.g., cashback, loyalty points, instant discount, a statement credit, a rebate) when the user satisfies a health activity requirement at the time of a payment transaction made using a payment account of the user.

For example, the benefit of the offer can be provided to the user, as an incentive to promote healthy life style, in addition to a benefit provided to the user as an incentive to make certain types of purchases, when the payment transaction meets payment requirements of the offer. Thus, if the user meets both the payment requirements of an offer and the health activity requirements of the offer, the user is awarded with both benefits. However, if the user meets the health requirements but not the payment requirements, the user is not provided with the benefit associated with the health requirement in some embodiments.

In one embodiment, a mobile application is used to track health related activities, such as walking, jogging, running, excising, fitness activities, healthy food consumption, etc. The data collected about the health related activities is used by the transaction handler of an electronic payment processing network to determine whether the user meets the health related requirements of the offer, as well as the payment transaction requirements of the offer.

For example, at the time of the authorization of a payment transaction in the payment account of the user, a portal of the transaction handler may be configured to communicate with a server hosting health activity data of the mobile application. An authorization protocol, such as OAuth, can be used by the mobile application to authorize the portal of the transaction handler to access the health activity data of the user stored in a server. Alternatively, the portal may query the mobile application to determine whether a predetermined health requirement of the user is satisfied at the time of the authorization of the payment transaction.

If both the transaction requirements and the health activity requirements are satisfied at the time of authorization of a payment transaction of the user in the electronic payment processing network, a benefit of the reward is provided to the user (e.g., via the transaction handler, the portal of the transaction handler, or a loyalty program host).

As a result of the system, the incentive rewards can be formulated based on both payment transaction requirements and the health activities (or other activities) tracked by mobile applications to provide a personal touch.

In the system of one embodiment, the portal of the transaction handler integrates the information tracked by the mobile application running in a mobile device carried by an individual user and the payment transaction processed at a centralized location in a payment processing network to facilitate the processing of new loyalty programs that have a personal touch.

When the mobile application authorizes the portal to access the full data on the server stored for the user of the mobile application, the portal does not need a special purpose interface for communicating with the mobile application. Thus, the implementation of the system is simplified; and the interoperability is improved.

When the portal is configured to query the mobile application directly to determine whether a health activity requirement is met, a special purpose interface can be used to improve the communication efficiency, by limiting the information to be transmitted to the portal. Limiting the transmission of the health activity data to the portal also improves the privacy protection for the user.

In one embodiment, a system and method provides a mobile application to track health related activities and combine the health related activity data with payment processing data to determine the eligibility of a user to the redemption of an offer benefit. The data collected about the health related activities is used by a transaction handler of an electronic payment processing network to determine whether the user meets the health related requirements, in addition to payment transaction requirements of an offer. If both the transaction requirement and the health activity requirement are satisfied at the time of authorization of a payment transaction of the user in the electronic payment processing network, a benefit of the offer is provided to the user.

Figure 3:
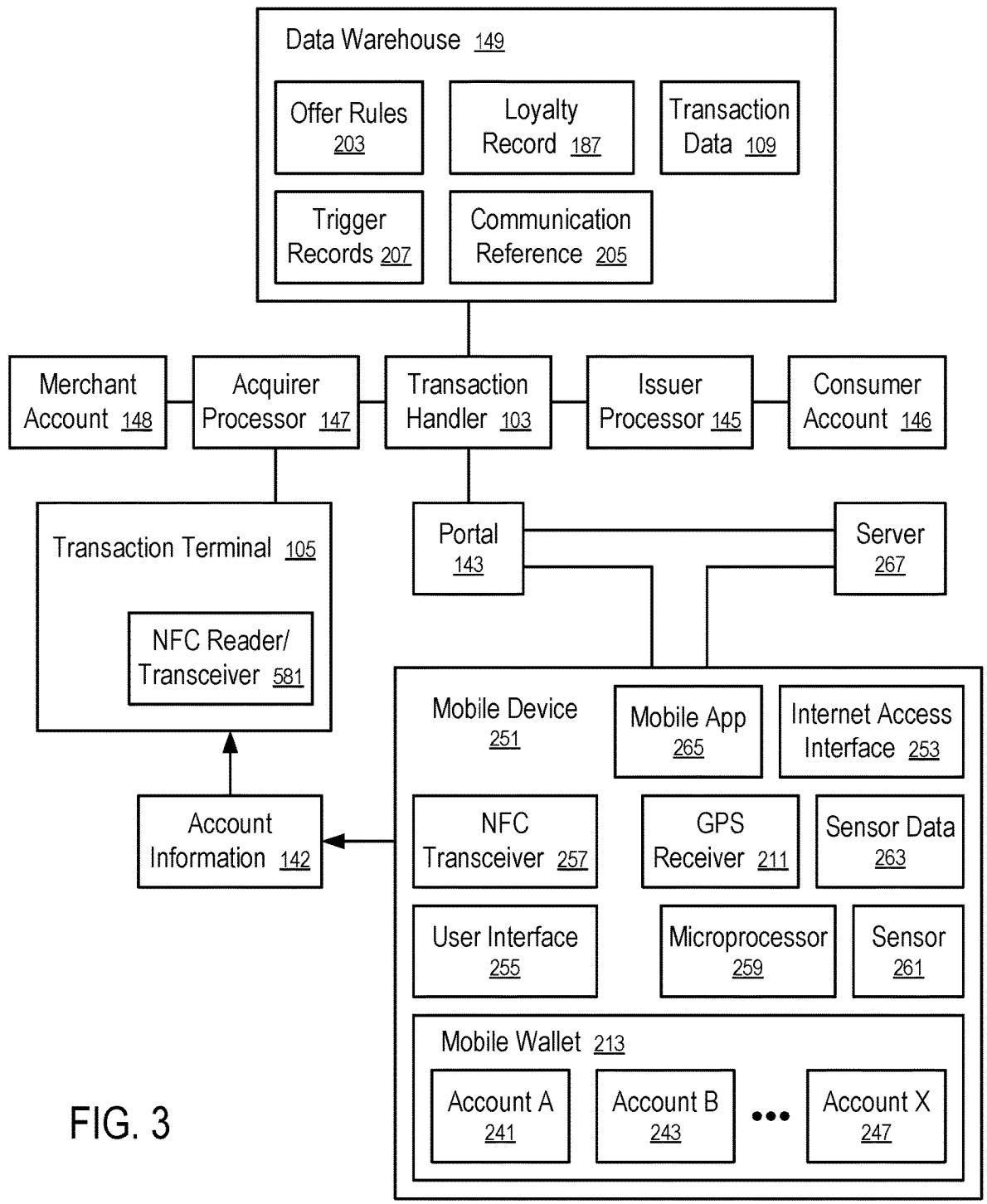
FIG. 3 shows a system to process a payment transaction in connection with information tracked via a mobile device according to one embodiment.

FIG. 3 shows a system to process a payment transaction in connection with information tracked via a mobile device according to one embodiment.

In FIG. 3, the mobile device (251) is configured to run a mobile application (265) that uses the sensor (261) (e.g., accelerometer, temperature sensor) to generate sensor data (263) related to health activities of the user. In some embodiments, the user may also use a graphical user interface (255) to provide input indicating the health activities of the user.

In some embodiments, the health activity data is location dependent; and the GPS receiver (211) for the mobile device (251) is used to tag/label relevant health activity data and/or the sensor data (263) using the real time location of the mobile device (251) determined by the GPS receiver (211).

In some embodiments, the mobile application (265) includes instructions configured to be executed in the one or more microprocessors (259) of the mobile device (251) to perform the operations discussed herein. The mobile application (265) may use the interface access interface (253) to communicate with the server (267) to store at least a portion of the sensor data (263) in the server (267) during a time period in which a communication connection is available between the sever (267) and the mobile device (251).

In FIG. 3, the mobile device (251) includes a mobile wallet (213) storing identification information of one or more accounts (241, 243, . . . , 247). The mobile wallet (213)

is configured to communicate the account information (142) of one of the account (241, 243, ..., 247), such as the consumer account (146), to a transaction terminal (105) via a near field communication (NFC) transceiver (257). The transaction terminal (105) has a corresponding NFC reader/transaction (281) to communicate with the mobile wallet (213) for the initiation of a transaction in an account (146) identified by the account information (142).

In FIG. 3, after the transaction terminal (105) initiates a payment transaction using the account information (142), the transaction terminal (105) transmits to an acquirer processor (147) an authorization request for a transaction in the account (146) identified by the account information (142). The acquirer processor (147) is in control of a merchant account (148) associated with the transaction terminal (105).

The acquirer processor (147) forwards the authorization request to the transaction handler (103), requesting the authorization of the payment transaction between the consumer account identified by the account information (142) and the merchant account (143) identified by the acquirer processor (147).

In an electronic payment processing system, the transaction handler (103) interconnects at least one issuer processor (145) and at least one acquirer processor (147). Based on the account information (142), the transaction handler (103) communicates the authorization request to the issuer processor (145) of the consumer account (146).

After the issuer processor (148) authorizes the payment transaction, the authorization response is propagated back to the transaction terminal (105) via the transaction handler (103) and the acquirer processor (147).

In one embodiment, the transaction handler (103) is coupled with a data warehouse (149) that stores the offer rules (203) of a loyalty offer, which can be configured to have a benefit such as cashback, reward points, discounts, statement credits, incentives, etc.

The transaction handler (103) stores in the data warehouse (149) the transaction data (109) of the user for the payment transactions made in the consumer accounts (146). The data warehouse (149) stores one or more trigger records (207) to detect a payment transaction that would trig the evaluation of the offer rules (203) to determine whether or not the user is entitle to the benefit of the offer in response to the detected payment transaction. A trigger record (207) identifies a set of conditions. The transaction handler (103) checks a payment transaction against the set of conditions specified in the trigger record (207). When the set of conditions specified in the trigger record (207) is satisfied by a particular transaction currently being processed by the transaction handler (103), the trigger record (207) instructs the transaction handler (103) to provide information identifying the particular transaction for further processing, e.g., whether the payment transaction satisfies the offer rules (203). Whether the health related requirements are met by the user.

In one embodiment, the payment requirements may involving multiple payment transactions. In response to a determination that the detected payment transaction causes the user to meet the payment transaction requirement of the offer (e.g., based on the detected payment transaction and, in some embodiments, one or more prior transactions), the portal (143) is configured to use the communication reference (205) of the mobile device (251) to determine whether the user meets the health activity requirements for the offer.

In one embodiment, the portal (143) communicates with the server (267) to access health activity data stored by the mobile application (265) (e.g., via the internet access interface (253)) in the server (267). The server (267) is configured to request the portal (143) to present an authorization certificate issued by the mobile application in order to allow the portal (143) to access the data stored in the server (267) by the mobile application (265). In some embodiments, the mobile application (265) provides the authorization certificate in real time during the authorization of the detected payment transaction, or before the payment transaction. In one embodiment, the portal (143) uses a standardized authorization protocol (e.g., OAuth) to obtain the authorization to access the data in the server (267) and determine whether the health activity data of the user meets the requirement of the offer rules (203).

In another embodiment, the portal (143) is configured to use a special purpose application program interface (API) to query the mobile application to determine whether the health activity data of the user meets the requirement of the offer rules (203).

After the determination that the health activity data of the user meets the requirement of the offer rules (203), the portal (143) and/or the transaction handler (103) provides the benefit of the offer to the user, such as cashback, loyalty points, a discount provided via the transaction handler adjusting the transaction amount of the payment transaction, a statement credit in the consumer account (146) initiated via the transaction handler (103), or other incentives.

Figure 4:
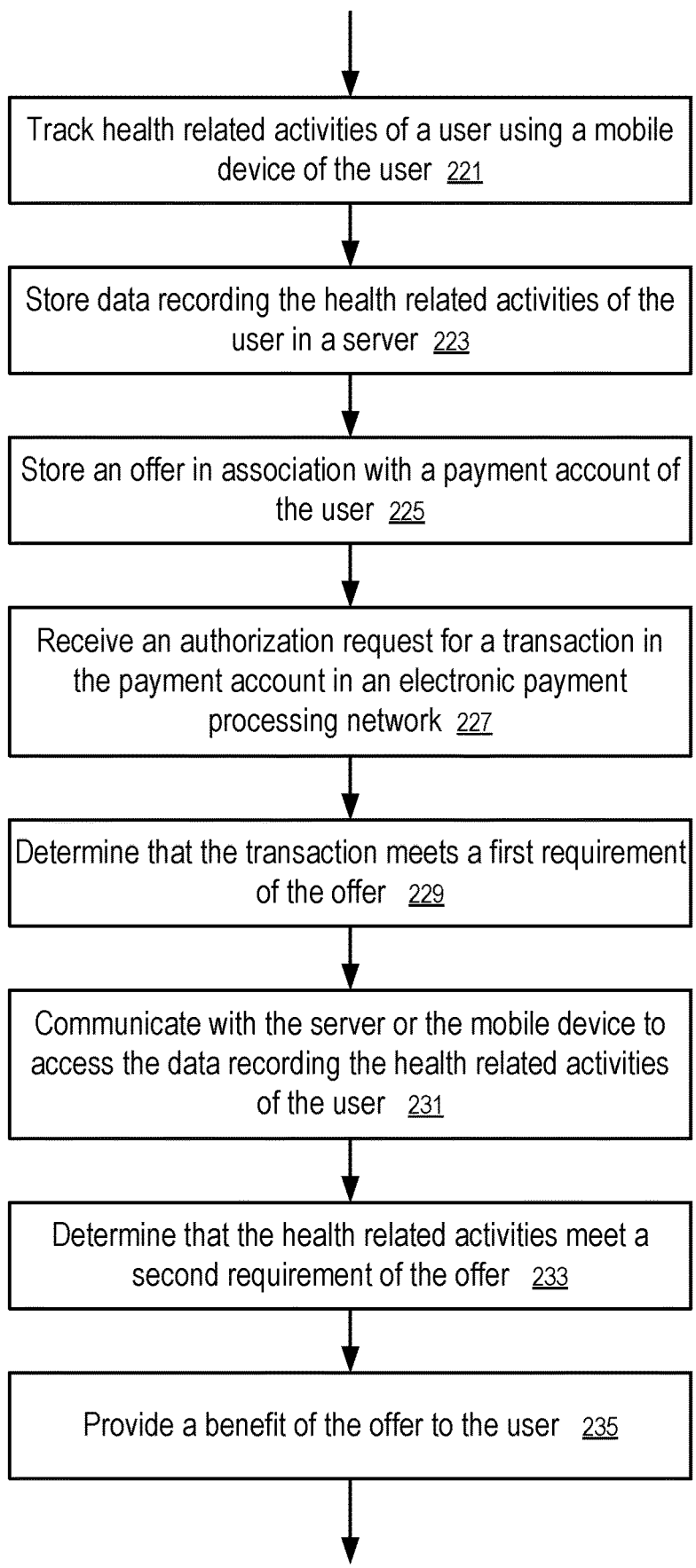
FIG. 4 shows a method to process an offer in view of a payment transaction and health information tracked via a mobile device according to one embodiment.

FIG. 4 shows a method to process an offer in view of a payment transaction and health information tracked via a mobile device according to one embodiment. For example, the method of FIG. 4 can be implemented in the system of FIG. 3.

In FIG. 4, a computing system is configured to: track (221) health related activities of a user using a mobile device of the user; store (223) data recording the health related activities of the user in a server; store (225) an offer in association with a payment account of the user; receive (227) an authorization request for a transaction in the payment account in an electronic payment processing network; determine (229) that the transaction meets a first requirement of the offer; communicate (231) with the server or the mobile device to access the data recording the health related activities of the user; determine (233) that the health related activities meet a second requirement of the offer; and provide (235) a benefit of the offer to the user.

Figure 9:
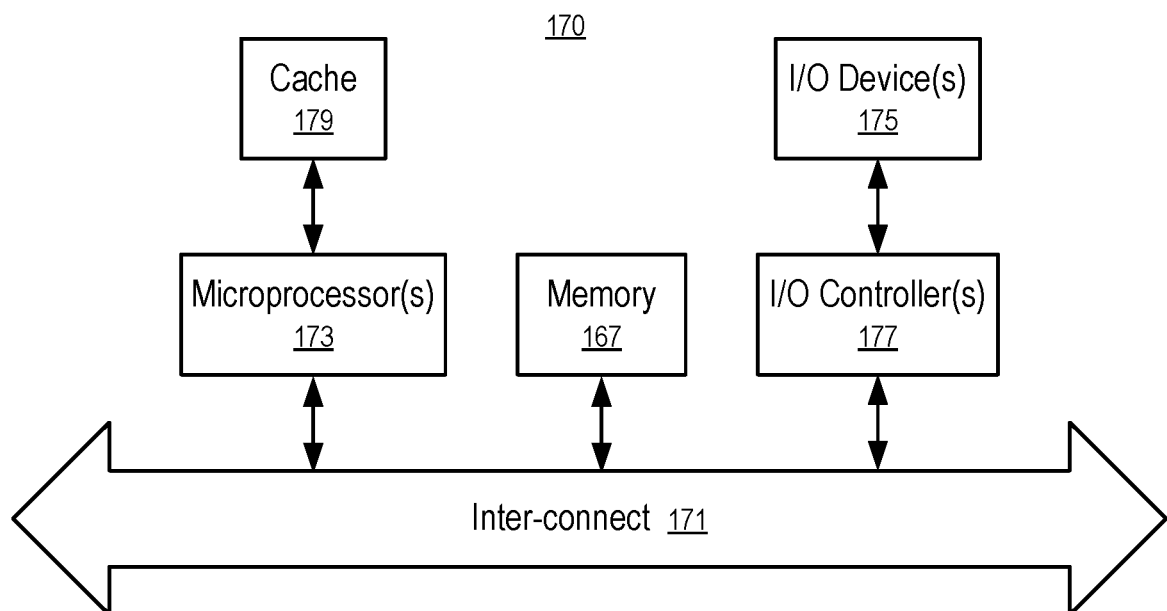
FIG. 9 illustrates a data processing system according to one embodiment.

In one embodiment, the computing system includes one or more of: the mobile device (251), the transaction handler (103), the portal (143), the data warehouse (149), and the server (267), each of which can be implemented using one or more of the data processing system illustrated in FIG. 9, with more or less components.

Thus, at least one system and method disclosed herein provides a mobile application to track health related activities, such as walking, jogging, running, excising, fitness activities, healthy food consumption, etc. The data collected about the health related activities (and/or other activities) is used by a transaction handler of an electronic payment processing network to determine whether the user meets the health related requirements (and/or other requirements) of an offer, in addition to the payment transaction requirements of the offer. If both the transaction requirement and the health activity requirement are satisfied at the time of authorization of a payment transaction of the user in the electronic payment processing network, a benefit of the reward (e.g., cashback, loyalty points, and instant discount) is provided to the user via the transaction handler.

Mobile payment wallet services, such as Apple Pay and Google Wallet, allow a cardholder to store multiple credit cards on a mobile device.

In one embodiment, a mobile wallet application is configured to use geo-location to determine the order of the credit cards (and/or other payment accounts, such as debit cards, prepaid cards) in which the payment accounts are presented to make a payment at a transaction terminal, such as a point of sales terminal of a merchant.

For example, the mobile wallet may use the top ranked payment account to make the payment without the user having to manually select a payment account from the plurality of payment accounts configured in the mobile wallet. Optionally, the mobile wallet may show the sorted list of payment accounts to allow the user to select a payment account to make the payment at the point of sales terminal of the merchant.

In one embodiment, the order of the credit cards is determined before the mobile wallet is used to make a payment and/or before the mobile wallet communicates with the points of sales terminal to reduce the processing/waiting time at the point of sales terminal. For example, in response to a determination that the mobile device is having a location inside a retail location, the mobile wallet may optimize the order based on reward optimization and/or user preferences.

For example, in one embodiment, the mobile wallet is configured to determine the type of the merchant of the retail store in which the mobile device is currently and determine which payment card is to be automatically selected at the time of purchase, checkout, or payment.

In some embodiments, the mobile wallet is further configured to identify the loyalty programs acceptable the point of sales terminal of the merchant and communicate information from the mobile wallet to the point of sales terminal to identify the member information of the user of the mobile wallet. For example, a point of sales terminal of a merchant may accept the phone number of the user as an identifier of a member in the reward program of the merchant. For example, a point of sales terminal of a merchant may accept a member ID of the user issued by the merchant to the user in the reward program of the merchant. In one embodiment, the reward membership information is transmitted to the point of sales terminal of the merchant prior to, or together with, the payment information that identifies a payment account of the user. In one embodiment, the payment information is a token or a one-time account that represents, or is associated with, the payment account of the user.

For example, loyalty programs associated with payment cards may provide rewards of different levels for payments with merchants of different types. For example, the loyalty program of one card may offer better rewards on gas purchases and another on restaurant. For example, a user may prefer to use a particular payment card to make one type of purchases and another payment card to make another type of purchases, for reasons may or may not related to rewards. In one embodiment, the mobile wallet is configured to determine the merchant type based on the location coordinates of the mobile device and then automatically rank the payment accounts based on predicted rewards benefits and/or user preferences.

In one embodiment, when the mobile wallet is used to make a payment at the point of sales terminal of a merchant, the mobile wallet uses the top ranked payment account. Alternatively or in combination, the mobile wallet may provide a user interface that allows the user to reject the use of the top ranked payment account and/or select an alternative payment account. The ranking according to the optimization of the reward benefits and/or pre-specified user rules can reduce and/or eliminate the need for user intervention to select a payment account from the mobile wallet and thus reduce the time at the point of sales terminal and improve the overall efficiency of the payment system.

In one embodiment, the mobile wallet application will automatically select the better rewards card to use depending on the identity of the merchant determined based on the location of the mobile device.

In one embodiment, after multiple payment cards are configured and/or stored in a mobile wallet on the mobile device, the mobile wallet allows the user to select the option of using a default card to make payments. In one embodiment, the default card is dynamically determined based on location coordinates of the mobile device.

For example, in one embodiment, for one or more of the payment cards, the mobile wallet presents a user interface allowing the user to specify merchant attributes, such as merchant types (e.g., gas, drug store, restaurant), etc., such that when the current location of the mobile device is determined to have the merchant attributes specified for the corresponding payment card, the mobile application is configured to identify the corresponding payment card as the default card for the current location.

In one embodiment, when the merchant attribute determined for the current location satisfies none of the payment cards in the mobile wallet, a predetermined card is selected as the default card.

In one embodiment, when the merchant attribute determined for the current location satisfies more than one of the payment cards in the mobile wallet, the payment cards are ranked based on prior selection histories and the reward rules of the reward programs associated with the payment cards.

For example, the issuers of the payment cards may communicate the latest rewards information to the mobile wallet application. The reward program of a payment card may specify rewards as different percentage of transaction amounts based on different merchant types corresponding to different merchant category codes; and the association of the reward percentages with respective merchant categories may change periodically (e.g., monthly, quarterly). Using the reward percentage information and/or user preferences, the mobile wallet application is configured to dynamically rank the payment accounts in a preferred order for making payments. Thus, the user does not have to manually select a default card for a particular combination of merchant attributes.

The feature of the mobile wallet to dynamically rank the payment accounts configured in the mobile wallet would prompt competition among issuers and/or loyalty programs to offer better rewards than their competitors in order to become the "top of the wallet" credit card.

In one embodiment, a location determination system of the mobile device, such as a global positioning system (GPS) receiver in a smart phone, can be used to determine the location coordinates of the current location of the mobile device and thus look up the merchant and corresponding merchant attributes based on the location coordinates.

For example, the geolocation feature on a smart phone can determine the merchant at the current location of the smart phone; and a database stored in the cloud can be used to determine the merchant type of the merchant.

In one embodiment, the mobile wallet is configured to weigh the reward benefits predicated based on the merchant category of the current location and preferences of the users to compute a score for each of the payment accounts. The scores of the payment accounts are used to rank the payment accounts in the mobile wallet. The mobile wallet allows the user to select payment accounts for the dynamically sorted list of payment accounts to make a payment. The user selection is used with a machine learning technique to train the weights in the computation of the scores and thus reflect the user preference. Over a period of time, the mobile wallet is capable of presenting payment accounts in desirable orders that reflects both the optimization of reward benefits and user preferences. Thus, the accuracy of the top ranked payment card for making a payment at a location is improved.

In one embodiment, the mobile device is configured to automatically retrieve reward rules from issuers of the payment accounts and/or the respective loyalty program providers.

Figure 5:
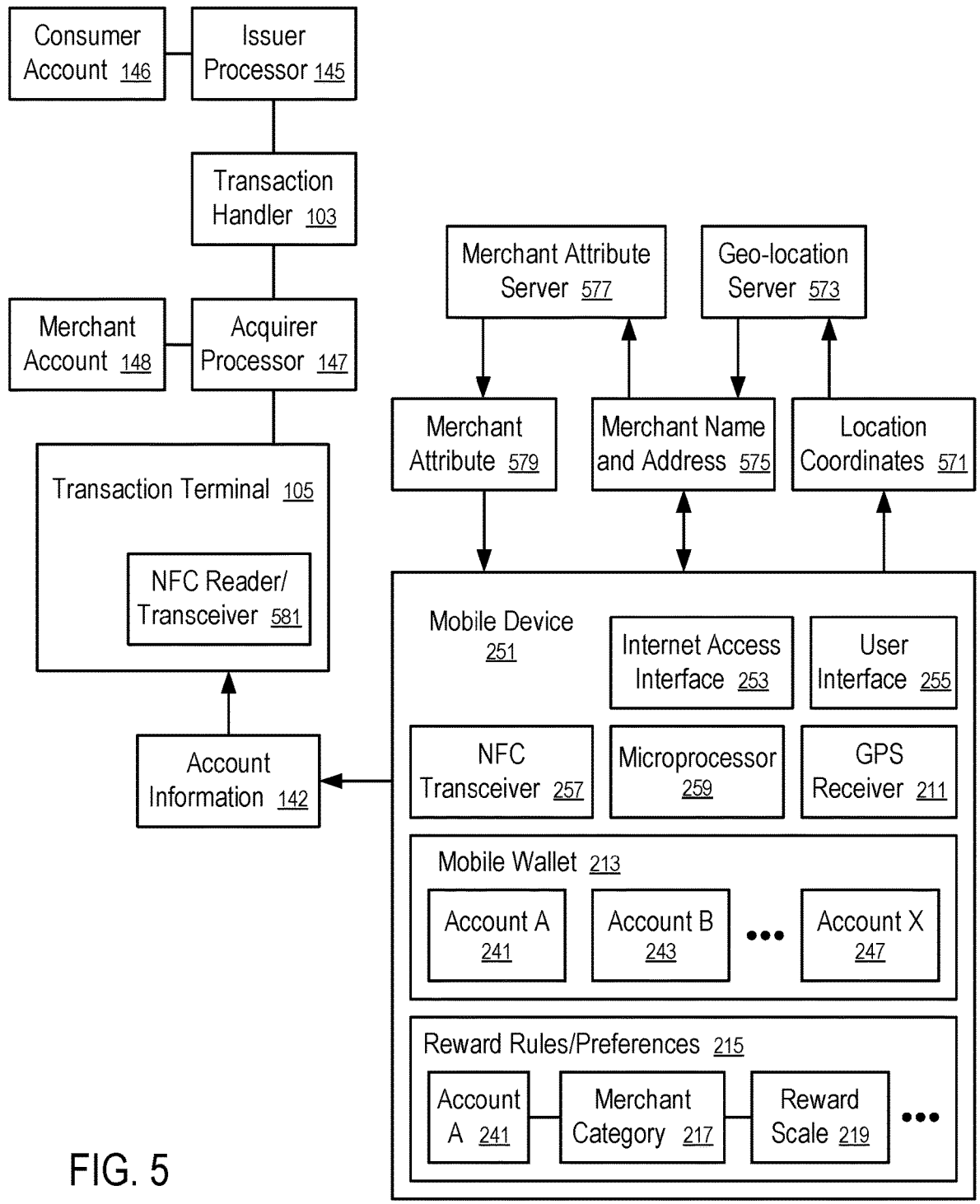
FIG. 5 shows a system to present account information according to one embodiment.

FIG. 5 shows a system to present account information according to one embodiment. In FIG. 5, the mobile device (251) has a GPS receiver (211) configured to determine the location coordinates (271) of the current location of the mobile device (251). The mobile device (251) has at least one internet access interface (253) for communication with remote servers. Examples of such an internet access interface (253) include a cellular communications transceiver, a wireless local area network transceiver, etc.

In FIG. 5, a geo-location server (273) provides Application Programming Interfaces (API) that allow the mobile wallet (213), implemented as a mobile application executed by the microprocessor (259) in the mobile device (251), to submit location coordinates (271) of the current location of the mobile device (251) and retrieve various information about that location, such as the name and address (275) of a merchant that contains the location.

For example, APIs of Google Places accept the latitude and longitude as inputs to obtain the name and address of the business at the location. Further details of the APIs of Google Places can be found in Appendix A or https://developers.google.com/places/documentation/.

In FIG. 5, a merchant attribute server (277) stores a table to look up the merchant attribute (279), such as the merchant category code (MCC) of the merchant identified by the merchant name and address (275).

For example, APIs of Visa Supplier Locator can provide the MCC of 5541 and 5542 for "Shell Oil" and "2901 S NORFOLK ST SAN MATEO Calif. 94403". Further details of the APIs of Visa Supplier Locator can be found in Appendix B or https://www.visa.com/supplierlocator/.

In FIG. 5, the mobile wallet (213) stores a set of data identifying payment accounts (241, 243, . . . , 247).

In one embodiment, the mobile wallet (213) has a user interface (255) that allows the user to specify, for each of the accounts (241, 243, . . . , 247), a merchant category code group. For example, the user interface (255) provides options such as "gas" and "grocery stores". The user may select the "gas" group of merchant category code for Account A (241), and the "grocery stores" group of merchant category code for Account B (243).

In one embodiment, the user interface (255) is configured to allow the user to select an account (e.g., 247) as a default account and thus being associated with all merchant categories. When the mobile wallet (213) is used at a location having a merchant category code that is not associated with other accounts (e.g., 241, 243, . . . ), the default account is considered a match.

In one embodiment, the user selection of the merchant category code groups for association with the accounts (e.g., 241, 243, . . . , 247) represents the user preferences of the accounts. For a given set of merchant category codes associated with the current location of the mobile device (251), the mobile wallet (213) is configured to determine matching scores of the accounts (241, 243, . . . , 247) configured in the mobile wallet. In one embodiment, the more merchant category codes an account has that do not match with the merchant category codes associated with the current location, the lower the matching score of the account for the current location.

In one embodiment, the mobile wallet is configured to periodically retrieve from the loyalty programs and/or issuers of the accounts (241, 243, . . . , 247) the reward rules (215).

For example, the Chase's Freedom Card offers a promotion where, for three months, restaurant purchases would earn 5% cash back. The mobile wallet associates the account (241) with the merchant category (217) (e.g., restaurant) and with the reward scale (e.g., 5% cash back) as part of the reward rules (215).

In one embodiment, the matching score includes the weight of the reward scale. For example, the higher the reward scale, the larger is the added weight for matching with the merchant category of the account (e.g., 241).

In one embodiment, when a user selects a merchant category group (217) for association with an account (241), the user interface (255) allows the user to specify a reward scale. The reward scale quantifies the user preference, which can be compared with the corresponding reward scales (219) of reward rules. Thus, the user preference and the reward rules can be considered in a unified matching score.

Further, in one embodiment, the mobile wallet is configured to adjust the user specified reward scale (219) according to usage patterns of the mobile wallet to optimize the scoring to improve the accuracy in predicting the payment account the user would like to use at a location of a given set of merchant category codes.

In one embodiment, after the determination of the merchant attribute (279) (e.g., merchant category codes) for the location determined by the GPS receiver (211), the mobile wallet (213) sorts and/or selects a top matching account (e.g., 241) as the "top of the wallet" account.

For example, in FIG. 5, the mobile device (251) includes an NFC transceiver (257) to communicate account information (142) to the NFC reader/transceiver (281) of the transaction terminal (105) of the merchant to make the payment using the account information (42) that identifies the "top of the wallet" account.

In one embodiment, the user interface (255) is configured to optionally show the list of sorted accounts and allow the user to select an account for the payment transaction at the current location, before the mobile wallet (213) communicates the account information (142) to the transaction terminal (105). If the "top of the wallet" account is not selected, the mobile wallet (213) adjusts the reward preference (215) (e.g., via a machine learning technique) to improve the accuracy in predicting the "top of the wallet" account. Thus, over a period of time, the accuracy of predictions of the mobile wallet become satisfactory; and the user may simply use the mobile wallet (213) to make the payment using the "top of the wallet" account identified by the mobile wallet (213), without requesting a view of the list accounts (241, 243, . . . , 247) that is dynamically ordered according to the merchant category codes of the location coordinates (271) determined by the GPS receiver (211).

In FIG. 5, the transaction terminal (105) is connected to an electronic payment processing network, which includes an acquirer processor (147) controlling the merchant account (148) and the issuer processor (146) controlling the consumer account (146) identified by the account information (142). The transaction handler (103) interconnects the issuer processors (e.g., 145) and the acquirer processors (e.g., 147) in the electronic payment processing network.

In one embodiment, payment accounts in a mobile wallet implemented in a mobile device are sorted and selected for payment transactions based on the location coordinates determined by the location determination system of the mobile device. For example, after the global positioning system (GPS) receiver of the mobile device determines its current location coordinates, the mobile device is configured to determine one or more attributes associated with the location coordinates. A set of rules are applied to score the payment accounts based on the attributes and sort the payment accounts in the mobile wallet based on the scores. When the mobile wallet is used to make a payment, the payment accounts are presented in the sorted order for making the payment. Details regarding the prioritization of payment accounts in a mobile wallet based on its location coordinates can be found in U.S. patent application Ser. No. 14/984,762, filed Dec. 30, 2015 and entitled "Location Dependent Communications between Mobile Devices and Transaction Terminals", the entire disclosure of which application is hereby incorporated herein by reference.

In one embodiment, the transaction handler (103) is configured to use trigger records for a transaction handler to identify a subset of authorization requests that satisfy the conditions specified in the trigger records for further processing (e.g., to determine whether or not the selected authorization requests satisfy benefit redemption requirements of offers identified in the respective trigger records). Further, the portal (143) is configured to identify communication references of the users associated with the authorization requests that satisfy the offer redemption requirements, and use the communication references to transmit real-time messages to the users in parallel with the transaction handler providing responses to the respective authorization requests. Details in one embodiment regarding the generation and delivery of messages in real-time with the processing of transactions and/or the use of trigger records can be found in U.S. Pat. Nos. 8,359,274 and 8,407,148, both entitled "Systems and Methods to Provide Messages in Real-Time with Transaction Processing", the entire disclosures of which are hereby incorporated herein by reference.

The computing system of one embodiment can be optionally configured to further allow a user to use any of a plurality of registered accounts to participate in an offer campaign, such as performing transactions in the registered accounts to fulfill requirements to obtain the benefit of the offer campaign. In one embodiment, the offer campaign is programmed by offer rules that identify the real time interactions with the user in response to the actions of the user, such as transactions made using any of the registered accounts of the user. The offer campaign for the user is driven at least in part by the actions of the user, such as the transactions made by the user. In one embodiment, transactions in the registered accounts of the user jointly advances the offer campaign for the user; and a milestone achieved in the offer campaign using one account of the user is recognized as a milestone achieved by the user with respect to the multiple registered accounts. Thus, the offer campaign for the user can be advanced by the user via different accounts, as if the registered accounts were a same account; and the user is not limited to using a particular account to participate in the offer campaign, nor using different accounts to drive the offer campaign separately, as if the accounts were assigned to different users. Details in one embodiment regarding the configuration of real time interactions using multiple accounts of a user can be found in U.S. Pat. App. Pub. No. 2014/0074575, entitled "Systems and Methods to Program Interaction with a User through Transactions in Multiple Accounts", the entire disclosure of which is hereby incorporated herein by reference.

Figure 6:
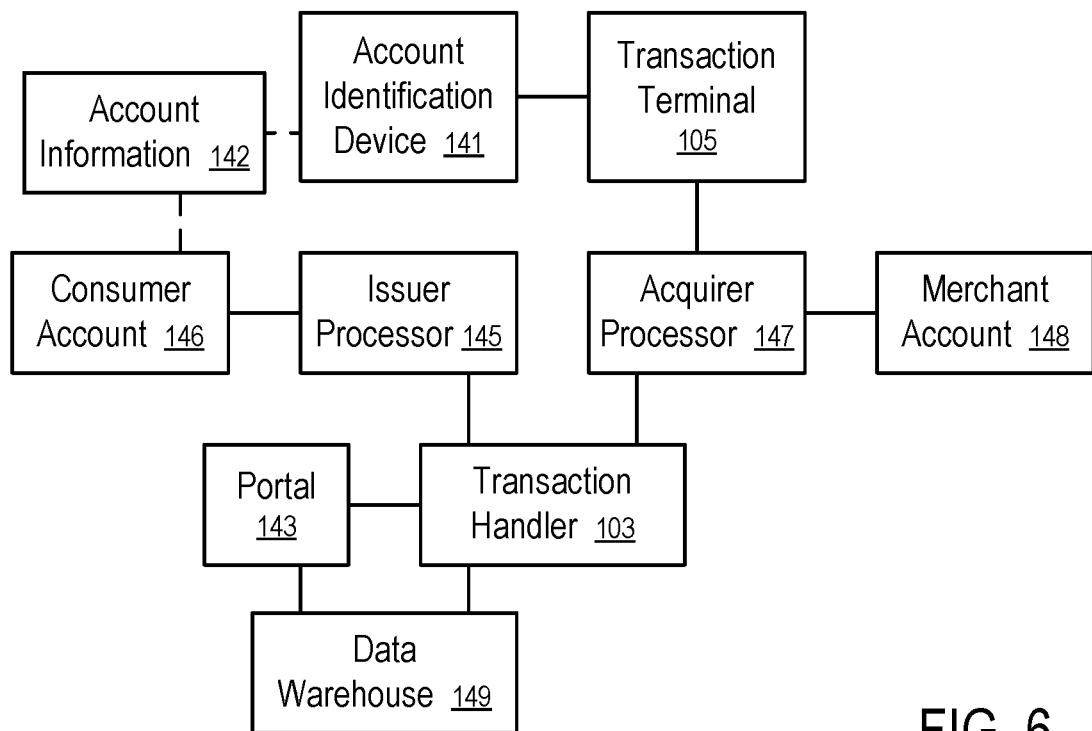
FIG. 6 shows a system to provide information based on transaction data according to one embodiment.

FIG. 6 shows a system to provide information and/or services based on transaction data according to one embodiment.

In one embodiment, a data warehouse (149) as illustrated in FIG. 6 is coupled with the transaction handler (103) to store the transaction data (109) and other data, such as account data, and transaction profiles.

In FIG. 6, a portal (143) is coupled with the data warehouse (149) to provide a communication channel outside the electronic payment processing network that connects one or more transaction terminals (e.g., 105) configured to initiate transactions of payments in the electronic payment processing network using account information (e.g., 142) obtained from one or more account identification device (e.g., 141), one or more issuer processors (e.g., 145) controlling consumer accounts (e.g., 146) identified by account information (e.g., 142) presented by one or more account identification devices (e.g., 141), and one or more acquirer processors (e.g., 147) controlling one or more merchant accounts (e.g., 148) associated with the respective transaction terminals (e.g., 105) of merchants, and the transaction handler (103) interconnecting the issuer processors (e.g., 145) and the acquirer processors (e.g., 147).

In FIG. 6, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between consumer account (146) and the merchant account (148).

Figure 7:
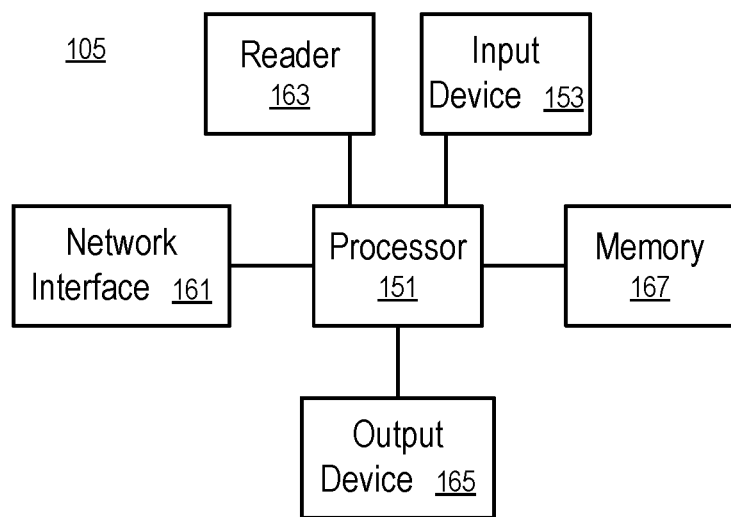
FIG. 7 illustrates a transaction terminal according to one embodiment.
Figure 8:
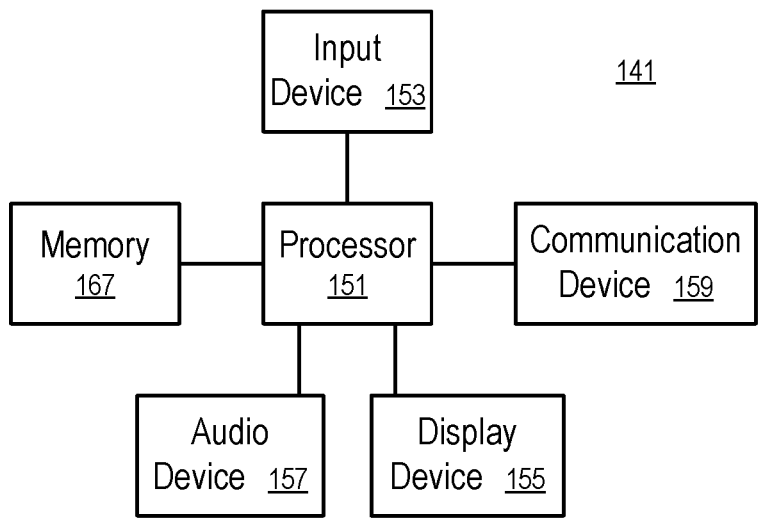
FIG. 8 illustrates an account identifying device according to one embodiment.

FIGS. 7 and 8 illustrate examples of transaction terminals (105) and account identification devices (141). FIG. 9 illustrates the structure of a data processing system (170) that can be used to implement, with more or fewer elements, at least some of the components in the system, such as the mobile device (251), the transaction handler (103), the portal (143), the data warehouse (149), the account identification device (141), the transaction terminal (105), etc. Some embodiments use more or fewer components than those illustrated in FIGS. 6-9.

In one embodiment, financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

In FIG. 6, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide and/or receive information using a communication channel outside the electronic payment processing network. The portal (143) may be implemented as a web portal, a telephone gateway, a file/data server, etc.

In FIG. 6, the transaction terminal (105) initiates the transaction for a user (e.g., a customer) for processing by a transaction handler (103). The transaction handler (103) processes the transaction and stores transaction data (109) about the transaction, in connection with account information (142) and/or other data about the user, collected from issuers or merchants, and/or other sources, such as social networks, credit bureaus, merchant provided information, address information, etc. In one embodiment, a transaction may be initiated by a server (e.g., based on a stored schedule for recurrent payments).

In FIG. 6, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user through a web connection. In one embodiment, the user may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 6, the transaction handler (103) uses the data warehouse (149) to store the records about the transactions, such as the transaction records or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 6, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 6, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user to organize the transactions in one or more consumer accounts (146) of the user with one or more issuers. The user may organize the transactions using information and/or categories identified in the transaction records, such as merchant category, transaction date, amount, etc. Examples and techniques in one embodiment are provided in U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, and entitled "Merchant Benchmarking Tool," the disclosure of which application is hereby incorporated herein by reference.

FIG. 7 illustrates a transaction terminal according to one embodiment. The transaction terminal (105) illustrated in FIG. 7 can be used in various systems discussed in connection with other figures of the present disclosure. In FIG. 7, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 7. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 7. For example, in one embodiment, the transaction terminal (105) is an ATM machine, which includes components to dispense cash under certain conditions.

FIG. 8 illustrates an account identifying device according to one embodiment. In FIG. 8, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 8, such as a cellular communications subsystem.

In one embodiment, the communication device (159) may access the account information (142) stored on the memory (167) without going through the processor (151).

In one embodiment, the account identification device (141) has fewer components than those illustrated in FIG. 8. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

In one embodiment, at least some of the components such as the transaction handler (103), the transaction terminal (105), the portal (143), the issuer processor (145), the acquirer processor (147), and the account identification device (141), can be implemented as a computer system, such as a data processing system (170) illustrated in FIG. 9. Some of the components may share hardware or be combined on a computer system. In one embodiment, a network of computers can be used to implement one or more of the components.

In one embodiment, the transaction handler (103) is a payment processing system, or a payment card processor, such as a card processor for credit cards, debit cards, etc.

FIG. 9 illustrates a data processing system according to one embodiment. While FIG. 9 illustrates various components of a computer system, it is not intended to represent any particular architecture or manner of interconnecting the components. One embodiment may use other systems that have fewer or more components than those shown in FIG. 9.

In FIG. 9, the data processing system (170) includes an inter-connect (171) (e.g., bus and system core logic), which interconnects a microprocessor(s) (173) and memory (167). The microprocessor (173) is coupled to cache memory (179) in the example of FIG. 9.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   receiving, from a mobile device and in a communication portal coupled with a processing system, a registration communication having an account identifier, wherein
      the mobile device has installed therein a mobile application that generates mobile data and communicates the mobile data to a server separate from the communication portal, and
      the server stores the mobile data in an account of a user of the mobile application;
   transmitting, from the communication portal a message configured to redirect the mobile device to the server, wherein in response to the message configured to redirect the mobile device to the server, the mobile device is configured to
      sign into the server using a credential of the account of the user of the mobile application;
      obtain from the server an access token that is different from the credential; and
      provide the access token to the communication portal;
   storing, by the communication portal in a data warehouse, data associating the account identifier with the access token, wherein the data warehouse further stores data associating the account identifier with an item related to the mobile data stored in the server that is separate from the data warehouse;
   receiving, from a terminal and in the processing system, an authorization request including the account identifier;
   in response to a determination that the item associated with the account identifier in the data warehouse is relevant to the authorization request that includes the account identifier,
      retrieving, by the communication portal from the data warehouse, the access token associated with the account identifier in the data warehouse;
      accessing, by the communication portal using the access token, the mobile data stored in the account of the user of the mobile application in the server; and
      generating, by the processing system, an authorization response to the authorization request based at least in part on the item associated with the account identifier in the data warehouse and the mobile data on the server accessed using the access token.

2. The method of claim 1, wherein the mobile device is further configured to provide the account identifier to the terminal to generate the authorization request.

3. The method of claim 1, wherein the account identifier is provided from the mobile device to the terminal via near field communication.

4. The method of claim 2, wherein the account identifier identifies a second account controlled by a computer separate from the server having the account storing the mobile data.

5. The method of claim 4, wherein the second account controlled by the computer hosts resources to be used in a transaction requested by the authorization request.

6. The method of claim 5, wherein the processing system is configured in a network in communication with the computer controlling the second account hosting the resources; and the authorization response is generated further based on authorization communications between the processing system and the computer.

7. The method of claim 5, wherein the item identifies a first set of conditions; and the authorization request is determined to be relevant to the mobile data stored in the server in response to a determination that the authorization request meets the first set of conditions.

8. The method of claim 7, wherein the item identifies a second set of conditions; and an amount of the resources requested in the second account controlled by the computer separate from the server is adjusted in response to a determination that the mobile data satisfies the second set of conditions.

9. The method of claim 8, wherein the accessing, by the communication portal using the access token, the mobile data stored in the account of the user of the mobile application in the server includes:
   transmitting a query from the communication portal to the server, the query identifying the second set of conditions; and
   receiving a response to the query from the server identifying whether or not the second set of conditions are satisfied by the mobile data identified by the access token.

10. The method of claim 8, wherein the accessing, by the communication portal using the access token, the mobile data stored in the account of the user of the mobile application in the server includes receiving, by the communication portal using the access token, the mobile data from the server.

11. The method of claim 8, further comprising:
   identifying an amount of resources based the accessing of the mobile data using the access token; and
   providing, by the processing system, the amount of resources to the user of the mobile application.

12. The method of claim 1, wherein the mobile data includes data tracking health related activities of the user of the mobile application.

13. A non-transitory computer storage medium storing instructions configured to instruct a computing apparatus to perform a method, the method comprising:
   storing, in a data warehouse, data associating an offer with a payment account and associating the payment account with a mobile application running in a mobile device;
   monitoring, by a transaction handler coupled with the data warehouse, payment transactions in the payment account made in an electronic payment processing network;
   detecting, by the transaction handler based on the monitoring, a message related to authorization of a payment transaction in the payment account in the electronic payment processing network;
   in response to the message being detected and authorization of the payment transaction being processed in the electronic payment processing network, establishing, by a portal coupled with the transaction handler, a communication channel with the mobile application running in the mobile device, where the mobile device tracks health related data of user of the mobile device;

determining, via the communication channel, whether or not a predetermined requirement of the offer is satisfied by the health related data in the mobile device;

identifying a level of a benefit the offer based on a result of the determining whether the predetermined requirement of the offer is satisfied by the health related data in the mobile device; and providing, by the transaction handler, the benefit of the offer to the payment transaction via the electronic payment processing network.

14. A system, comprising:

a mobile device running a mobile application configured to generate mobile data of a user of the mobile application;

a server in communication with the mobile device to store the mobile data in a first account of the user;

a data warehouse storing data associating
 an account identifier of a second account,
 a first set of transaction requirements, and
 a second set of non-transaction requirements;

a communication portal configured to receive, in a registration session from the mobile device, an account identifier of a second account, wherein the communication portal is configured to obtain, from the mobile device during the registration session, an access token to the first account on the server, and store in the data warehouse data associating the account identifier of the second account and the access token to the first account; and a transaction handler configured in an electronic payment processing network to monitor payment transactions in the electronic payment processing network and detect a first transaction in the second account that satisfies the first set of transaction requirements, wherein in response to the first transaction being detected by the transaction handler, the portal is configured to communicate with the server, using the access token stored in the data warehouse in association with the account identifier, to determine whether the mobile data stored in the first account of the user in the server satisfies the second set of non-transaction requirements;

wherein the transaction handler processes the transaction based at least in part on a determination of whether the mobile data satisfies the second set of non-transaction requirements.

15. The system of claim 14, wherein the mobile data identifying health related activities of the user.

16. The system of claim 14, wherein the mobile device is configured to obtain at least a subset of the mobile data from exercise equipment.

17. The system of claim 14, wherein the transaction handler is configured to provide a benefit to the user in response to a determination that the mobile data satisfies the second set of non-transaction requirements.

18. The system of claim 14, wherein the transaction handler is configured to receive an authorization request for the first transaction in the second account identified by the account identifier; and the first transaction is detected in response to the authorization request.

19. The system of claim 18, wherein the transaction handler is configured to instruct, in response to the authorization request, the communication portal to communicate with the server in determining whether the mobile data stored in the first account of the user in the server satisfies the second set of non-transaction requirements.

20. The system of claim 19, wherein the determining of whether the mobile data stored in the first account of the user in the server satisfies the second set of non-transaction requirements is performed prior to the transaction handler providing an authorization response to the authorization request.

* * * * *